May 29, 1956 O. L. PATTERSON 2,747,796

COMPUTING CIRCUITS

Filed May 28, 1954 4 Sheets-Sheet 1

$$\frac{E_C}{2} \cdot E_P = E_K \cdot E_L$$

$$E_Q = K\,\frac{E_{P'}}{E_M E_N}$$

*INVENTOR.*

OMAR L. PATTERSON

*BY*

Busser, Smith & Harding

ATTORNEYS $$E_U = \frac{E_S\ E_T}{K}$$

INVENTOR.
OMAR L. PATTERSON
BY Busser, Smith + Harding
ATTORNEYS $$(1) \qquad E_0 = \frac{1}{K}(E_A + e_A)(E_B + e_B)$$

$$(2) \qquad E_P = E_0 - \frac{1}{K}(E_A e_B + E_B e_A + e_A e_B) = \frac{E_A E_B}{K}$$

*INVENTOR.*
OMAR L. PATTERSON
*BY*
Busser, Smith + Harding
ATTORNEYS

May 29, 1956 O. L. PATTERSON 2,747,796

COMPUTING CIRCUITS

Filed May 28, 1954 4 Sheets-Sheet 4

INVENTOR.
OMAR L. PATTERSON
BY
Busser, Smith & Harding
ATTORNEYS

United States Patent Office 2,747,796
Patented May 29, 1956

2,747,796

COMPUTING CIRCUITS

Omar L. Patterson, Media, Pa., assignor to Sun Oil Company, Philadelphia, Pa., a corporation of New Jersey Application May 28, 1954, Serial No. 433,139
10 Claims. (Cl. 235—61)

This invention relates to computing circuits and, particularly, to circuits for the performance of multiplication and/or division.

This application is in part a continuation of my application Serial No. 239,279, filed July 30, 1951, which in turn is in part a continuation of my prior applications Serial Nos. 130,270 and 196,480, filed, respectively, November 30, 1949 and November 18, 1950.

Since the process of multiplication is non-linear, it presents a very difficult problem in electrical computing apparatus where a high degree of accuracy and response time are required. Multiplication has been accomplished by electromechanical devices, carrier waveform systems, nonlinear elements, multivariable tube characteristics, and various modulation systems. Electromechanical devices and carrier systems are capable of providing accuracies of the order of 0.1% but have poor response time. On the other hand, systems involving non-linear elements and characteristics have been generally restricted to a range of 1 to 5% in accuracy but are capable of a high speed of response.

The present invention relates to circuits for the performance of multiplication and/or division which combine high accuracy and good frequency response. In particular, the invention relates to circuits utilizing the exponential relationship between grid current and grid-cathode potential existing in a triode under conditions of low absolute values of potential of a grid with respect to the cathode for which grid current flows and for low grid current.

The general object of the invention as well as detailed objects particularly relating to features of construction and operation will become apparent from the following description read in conjunction with the accompanying drawings, in which.

Figure 4:
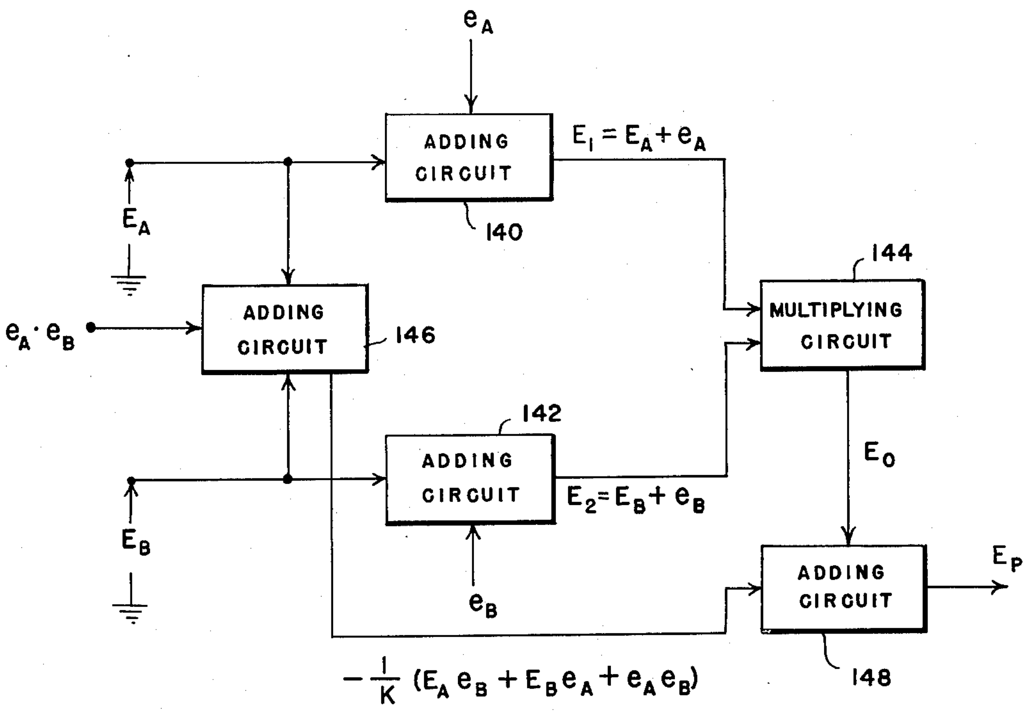
Figure 5:
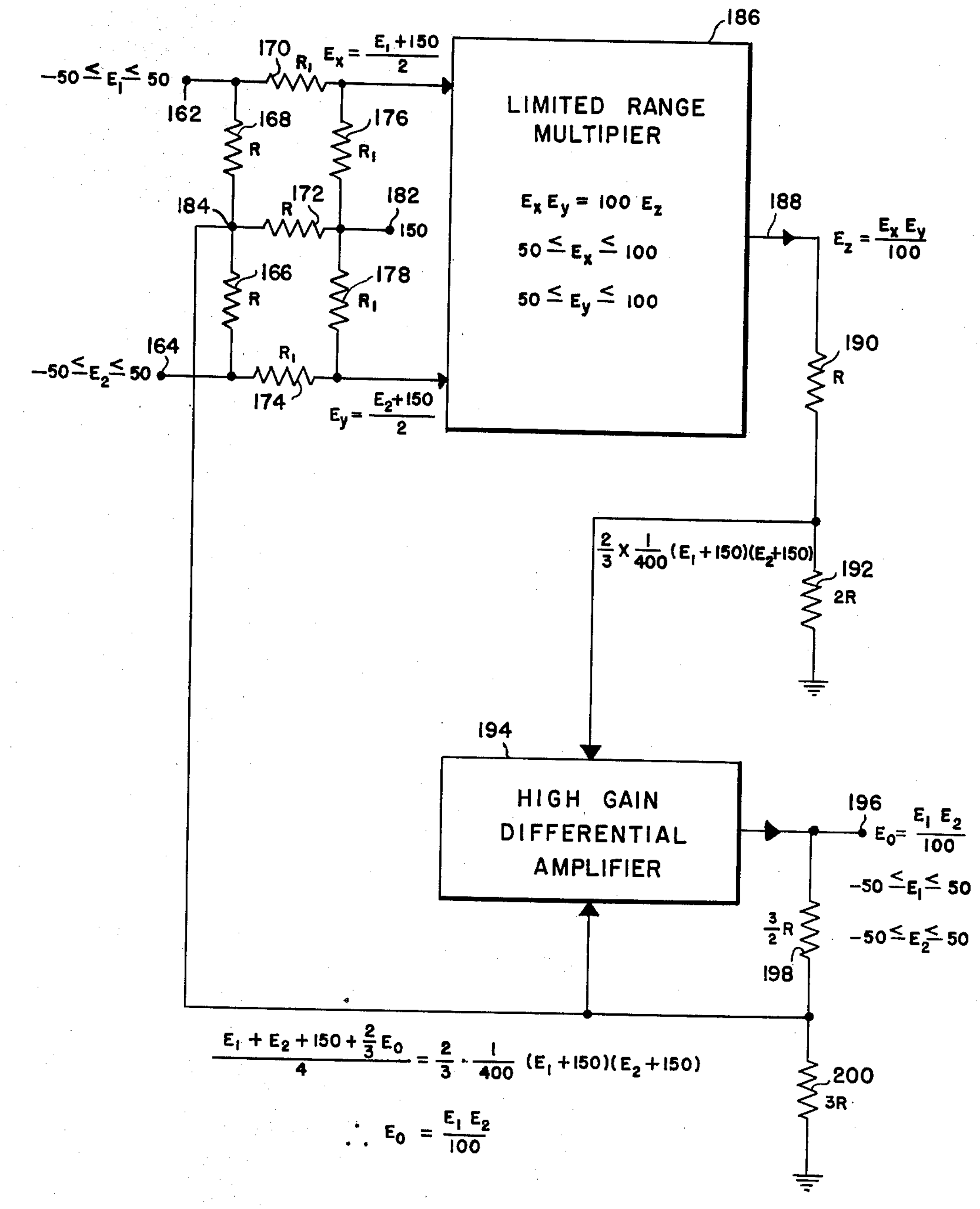

Figure 4 comprises a block diagram and various equations pertinent thereto, the diagram illustrating the fashion in which negative as well as positive quantities may be multiplied or divided; and Figure 5 is a diagram and various expressions pertinent thereto illustrating a further fashion in which negative as well as positive quantities may be multiplied.

The subject-matters of Figures 4 and 5 are described and claimed in my application Serial Number 403,799, filed January 13, 1954.

Figure 1:
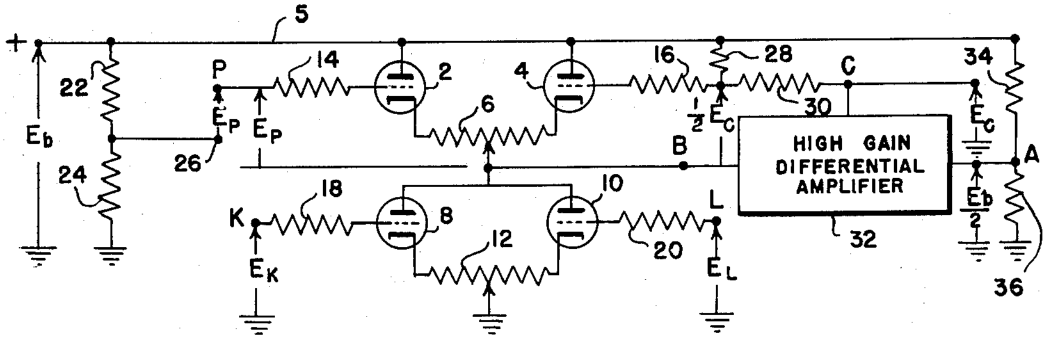
Figure 1 is a wiring diagram showing a multiplication and division circuit provided in accordance with the invention.

Referring first to Figure 1, a pair of triodes 2 and 4 have their anodes connected to a positive potential supply line 5, the potential of which will be designated $E_B$. The cathodes of these triodes are connected to the ends of the resistance of a potentiometer 6, the contact of which is connected to the anodes of the triodes 8 and 10 of a second pair, the cathodes of which are connected to the ends of a potentiometer 12, the contact of which is grounded. Equal resistances 14, 16, 18 and 20 are connected to the grids of the respective triodes and join them to various terminals. These resistances should have quite large resistance values, for example, ten megohms. The resistance 14 connects the grid of triode 2 to a terminal P. The resistance 18 connects the grid of triode 8 to a terminal K. The resistance 20 connects the grid of triode 10 to a terminal L.

A pair of equal resistances 22 and 24 connect the positive supply line 5 to ground to provide at a terminal 26 a potential which is one-half the potential of the positive supply line. A pair of equal resistances 28 and 30 connect the positive potential supply line 5 to the terminal C of a high gain differential amplifier 32. The junction of resistances 28 and 30 is connected to the grid of triode 4 through the high resistance 16. Terminal B of the differential amplifier is connected to the contact of potentiometer 6. Terminal A of the differential amplifier is connected to the junction of equal resistances 34 and 36 which are connected between the positive supply line 5 and ground to provide at their junction a potential equal to one-half the potential of the supply line.

The differential amplifier 32 may be of any of various types, for example of the type described in "Vacuum Tube Amplifiers," volume 18, Radiation Laboratory Series, page 485. Another form of high gain differential amplifier which may be used will be described hereafter. For the operation of the circuit now under discussion, this amplifier, whatever its form, is so connected that the potential output at terminal C is equal to a high amplification factor multiplied by the difference of the potentials at terminals A and B. Connections are so made that changes of potential at terminal C have the same sense as the changes at terminal A.

The triodes 2, 4, 8 and 10 are desirably of the same type and of closely similar characteristics. The resistances involved at potentiometers 6 and 12 are small and the grids of the triodes are either slightly positive or negative with respect to their cathodes under operating conditions depending upon the tube type used. As is known, for low absolute values of potential of a grid with respect to the cathode for which grid current flows, and for low grid current, an exponential relationship between the grid current and grid-cathode potential exists. If each of the grid input resistors is large, as stated above, and each effective cathode resistor is small, it may be readily seen that the grid-cathode potential of each of the triodes is, to a good degree of accuracy, proportional to the logarithm of the input potential plus a constant dependent almost solely on the grid input resistance.

As will be evident from the circuit arrangement, the sum of the currents flowing through the triodes 2 and 4 is equal to the sum of the currents flowing through the triodes 8 and 10. Assuming first identical characteristics of the triodes and location of the potentiometer contacts at the centers of resistances 6 and 12, and assuming, further, equality of resistances at 6 and 12, it will be noted that the function of the differential amplifier 32 is to maintain at teminal B the fixed potential which exists at terminal A and which is one-half the potential of the positive supply line. The differential amplifier enforces this condition by providing at terminal C a control of the potential of the grid of triode 4. The potential to ground existing at the junction of the equal resistances 28 and 30 will be noted to be one-half the potential to ground appearing at the terminal C plus one-half the potential of the positive supply line above ground. Accordingly, the potential which is enforced between the junction of resistances 28 and 30 and terminal B of the differential amplifier is one-half the potential at terminal C. Noting that the effective input potential $E_P$ at terminal P is referred to terminal 26 which, in turn, is one-half the potential of the positive supply line above ground, it will be evident that the enforced conditions are as given in the equation below the circuit diagram of Figure 1, i. e., the product of the effective input potentials to the triodes 2 and 4 is equal to the product of the input potentials to the triodes 8 and 10. What are referred to as the effective input potentials to triodes 2 and 4 are, of course, the potentials measured above the datum furnished by the terminal 26 and terminal B of the differential amplifier. The result is, accordingly, that terminal C provides an output which is proportional, with a factor of 2, to the product of the potentials $E_K$ and $E_L$ divided by the potential $E_P$.

It will be noted that in the foregoing circuit the plate voltages are held substantially constant and, furthermore, the sum of the currents through the upper triode pair is always equal to the sum of the currents through the lower triode pair. Consequently, both the upper and lower pairs are operating under substantially identical conditions of input potential products. A change of heater voltage or drift in tube characteristics tends to cancel out. Reference was made above to the use of triodes of substantially identical characteristics. While this is desirable, it is not essential and the adjustments at potentiometers 6 and 12 may be made to take care of differences in the tubes and, in addition, may be used to provide adjustment of exponents factors.

While only two tubes are illustrated in Figure 1 in each of the upper and lower groups, it will be evident that, if desired, additional tubes may be arranged in parallel with these to provide additional factors appearing in either the numerator or denominator of the value of the output potential, or in both. Thus, the quotient of any number of factors may be provided. Desirably, however, the number of tubes used should be equal in the upper and lower groups to provide substantially identical operating characteristics; but, obviously, this introduces no difficulty inasmuch as any one or more of the tubes may have a constant potential input which will then appear merely as a scale factor in the result.

The circuit of Figure 1 is particularly desirable for multiplication in which case $E_P$ will be merely a constant potential and will appear as a scale factor in the result. While the circuit may be used for division, as described, there is involved the situation that the potential $E_P$ must be applied above the relatively high potential of the terminal 26 rather than above ground. Consequently, for division, it is preferred to use a circuit such as will now be described with reference to Figure 2 in which all input potentials are applied with respect to ground.

Figure 2:
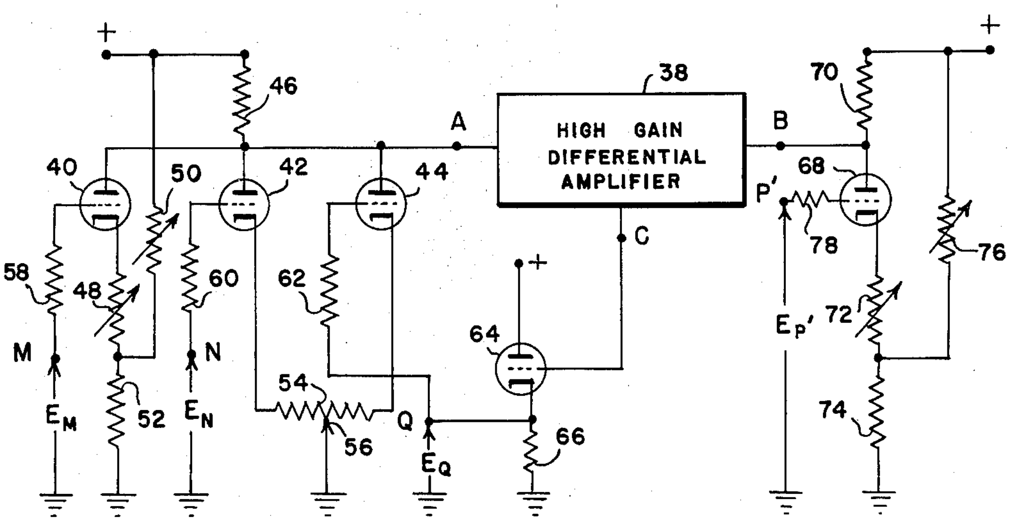
Figure 2 is a wiring diagram illustrating another multiplication and division circuit of high accuracy.

In Figure 2, there is shown a dividing circuit which has various features of operation in common with the multiplying circuit of Figure 1 but which is more adaptable to performance of division. The high gain differential amplifier of the type previously mentioned is indicated at 38 and here, again, A and B represent the input terminals and C represents the output terminal, the connections being made so that for a given change of potential at terminal A the change at output terminal C has the same sense. Three triodes 40, 42 and 44 have their anodes connected together and through a common resistance 46 to the positive potential supply line. The cathode of triode 40 is connected to ground and to the positive potential supply line through the arrangement of variable resistors 48 and 50 and fixed resistor 52. The cathodes of triodes 42 and 44 are connected to the ends of the resistaance 54 of a potentiometer having its variable contact 56 grounded. High resistances 58, 60 and 62 connect the grids of the respective triodes to terminals M, N and Q. A triode 64 in a cathode follower circuit has its cathode connected to terminal Q and connected to ground through the cathode load resistor 66. The grid of triode 64 is connected to the differential amplifier output terminal C. The anodes of triodes 40, 42 and 44 are connected to the terminal A of the amplifier. The terminal B of the amplifier is connected to the anode of triode 68 which anode is connected through resistor 70 to the positive potential supply line. The cathode of triode 68 is connected to ground and to the positive potential supply line through the arrangement of variable resistors 72 and 76 and fixed resistor 74 in the fashion previously described. The grid of triode 68 is connected to terminal P′ through high resistance 78.

Considering what has been previously discussed, it will be noted that the various triodes 40, 42, 44 and 68 are connected in logarithmic output arrangements as in the case of the triodes 2, 4, 8 and 10 of Figure 1. The grid input resistors are of very high and equal values, the triodes being of the same type, and the triodes 40, 42 and 44 have their anodes loaded by a common resistor 46. In all of these triodes, the cathode to ground connections have relatively low resistances.

Considering the circuit and the operation of the differential amplifier, it will be evident that the differential amplifier will maintain substantially equal the logarithmically derived potentials appearing at A and B. At the terminal A there will appear a potential proportional to the negative logarithm of the product of the potentials at terminals M, N and Q. At the terminal B there will similarly appear the negative logarithm of the potential appearing at terminal P′. The potentials $E_M$, $E_N$ and $E_{P'}$ at the terminals M, N and P′ may be considered arbitrarily determined from some external source. Through terminal C and the cathode follower arrangement of triode 64 the potential $E_Q$ at terminal Q is automatically adjusted so that, as an end result, this potential $E_Q$ will be given as the quotient of the potential $E_{P'}$ by the product of the potentials $E_M$ and $E_N$ multiplied by a constant, as indicated in the equation given below the diagram in Figure 2.

It will be evident that, instead of a single triode 68, there may be provided at the right-hand side of the differential amplifier any desired number of triodes connected similarly to the left-hand triodes of Figure 2 and having their anodes provided with a common anode resistor and connected to the terminal B. Similarly, additional triodes may be provided to the left of the amplifier with their anodes connected to the terminal A. The result would obviously be even more generally involving the provision of an output potential equal to the quotient of one product of potentials by another product of potentials. The operation of Figure 2 may be readily followed by considering the following:

Assume that the potential $E_{P'}$ is fixed and that, for example, the potential $E_M$ rises. The result would then be a decrease in potential at terminal A, a magnified decrease of potential at terminal C, a corresponding decrease of potential at terminal Q, and an increase of potential at terminal A tending to balance the original decrease of potential at this terminal due to the amplification occurring in the differential amplifier. The result, therefore, would be to maintain the product of potentials at terminals M, N and Q constant and equal to the potential at terminal P′. Assuming alternatively that the potential at A is constant and that the potential at B drops due to a rise in potential at terminal P′, the result would be a rise in potential at terminal C, a corresponding rise at terminal Q and a drop at terminal A to bring the potential at terminal A to the value of the potential at terminal B. Evidently, therefore, the variation of the value of the product potential $E_{P'}$ will result in a corresponding variation of potential $E_Q$ to maintain conditions as previously indicated. The net result is that the potential at $E_Q$ corresponds to a quotient as described above.

It may be noted that, under some circumstances, it is not actually necessary to introduce the product potential $E_{P'}$, for example, if it is merely desired to have the product of the potentials $E_M$, $E_N$ and $E_Q$ constant at some value which may, for example, be secured at a zero time. In such case, it would only be necessary to fix the potential at terminal B at some definite value corresponding, of course, to a logarithm of some fictitious potential. Such an arrangement will be found to be provided in my prior application Serial No. 196,480.

Extensions of the circuits of Figures 1 and 2 to the matters of obtaining powers, either fractional or integral, of potentials and, in particular, for the extraction of roots, will be obvious from the above, there being required only common controls of a plurality of the input elements with proper adjustments of the logarithmic constants.

Figure 3:
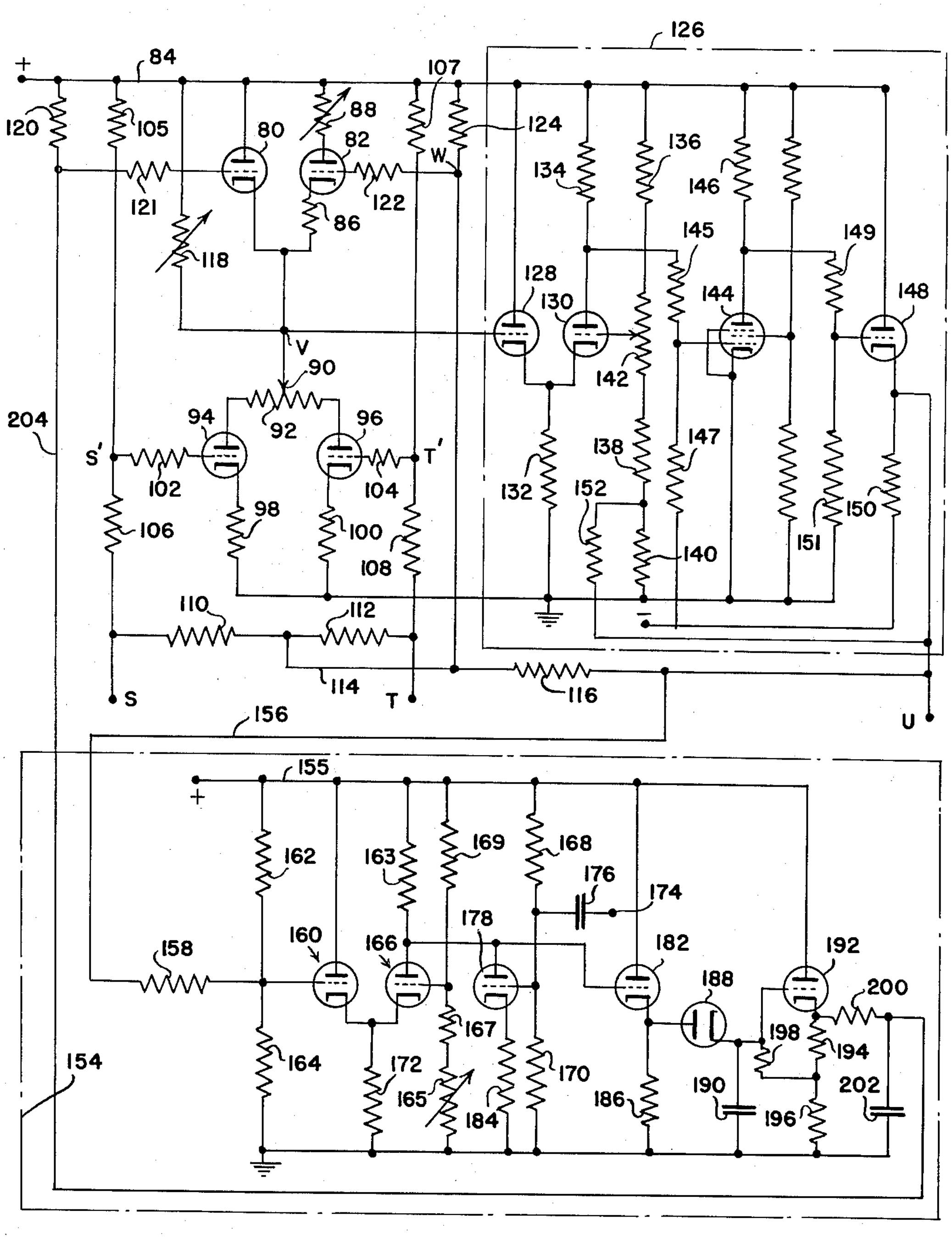
Figure 3 is a further wiring diagram illustrating still another multplication and division circuit having particularly desirable characteristics.

Reference may now be made to Figure 3 which shows still another circuit having particular advantages.

A pair of triodes 80 and 82 have their anodes connected to a positive potential supply line 84, the anode of triode 82 being connected to this line through a rheostat 88. The cathodes of these triodes are connected to a point V, the cathode of triode 80 being connected directly and the cathode of triode 82 being connected to this point through resistance 86. The point V is connected to the adjustable contact 90 of a potentiometer 92 the terminals of which are connected, respectively, to the anodes of triodes 94 and 96. The cathodes of these triodes are respectively connected through resistances 98 and 100 to ground. The grid of triode 82 is connected through a high resistance 122 to a point W, while the grids of triodes 94 and 96 are connected through high resistances 102 and 104 to points S′ and T′. The triodes 82, 94 and 96 should have closely similar characteristics and, desirably, triodes 94 and 96 are the elements of one dual triode and triodes 80 and 82 are the elements of a second similar dual triode. As will appear, it is not important that the triode 80 should have the same characteristics as the other three triodes, but it is convenient to provide the triodes by the elements of dual triodes as just indicated. The resistances 86, 98 and 100 may be of relatively low values (for example, 1000 ohms). The resistances 122, 102 and 104 are high resistances, for example, 10 megohms each, and should be nearly the same.

The triodes 82, 94 and 96 are operating as logarithmic tubes in which the plate currents are logarithmically related to the potentials appearing, respectively, between W and V, between S′ and ground, and between T′ and ground. The potentiometer contact 90 is adjusted so that the logarithmic characteristics of triodes 94 and 96 are substantially identical, and the rheostat 88 is adjusted so that the logarithmic characteristic of triode 82 is substantially identical with the characteristics of triodes 94 and 96. Assuming for the present that the current flow through triode 80 is constant, and that the point V has a potential which is one-half the potential of the line 84, it will be evident that since the sum of the currents through triodes 80 and 82 will be equal to the sum of the currents through triodes 94 and 96 there will result, in line with what has been discussed previously, a relationship such that the product of the potentials at S′ and at T′ will be equal to a constant times the potential appearing between W and V. As will now appear, the circuit maintains this constant relationship.

Point S′ is connected to an input terminal S through a resistance 106, while point T′ is connected to a terminal T through an identical resistance 108. Two equal resistances 110 and 112 in series join the input terminals S and T, and their junction is connected at 114 to the point W previously mentioned and through a resistance 116 to an output terminal U. The point V is connected through a rheostat 118 to the positive potential supply line. The grid of triode 80 may be connected to the positive potential supply line through a high resistance, for example, ten megohms, at 120, and for purposes of preliminary explanation it may be assumed that this connection exists though, as will appear hereafter, this connection may be missing, the grid of triode 80 being connected to a line 204 referred to hereafter. High resistances, of the order of one megohm, at 105 and 107 connect the positive supply line to the respective points S′ and T′. The point W is connected to the positive potential supply line through a resistance 124.

It has been mentioned that the product relationship depends upon the maintenance at point V of a potential above ground equal to half that of the positive potential supply line 84, and there is provided a differential amplifier indicated generally at 126 which maintains this potential at V by controlling the potential at W. This differential amplifier may take various forms, such as previously indicated, but a particularly desirable differential amplifier is illustrated. This comprises the triodes 128 and 130 having their cathodes connected together and to ground through a common resistance 132. The anode of triode 128 is connected directly to the positive potential supply line while the anode of triode 130 is connected thereto through a load resistor 134. A series arrangement of resistors 136, 138 and 140 and of potentiometer 142 is connected between the positive supply line and ground and the contact of potentiometer 142 is connected to the grid of triode 130. The grid of triode 128 is connected to the point V.

An amplifier stage is provided by a pentode 144 in conventional arrangement with an anode load resistor 146. The control grid of this pentode is connected through resistor 145 to the anode of triode 130 and to a negative potential supply line through a resistor 147. The output from the anode of pentode 144 is connected through resistor 149 to the grid of a triode 148 in a cathode follower arrangement with a cathode resistor 150 which is returned to the negative potential supply line. A resistor 151 is connected between the grid of triode 148 and ground. The terminal U referred to previously is connected to the cathode of triode 148. A feedback connection from the cathode of triode 148 through resistor 152 to the junction of resistors 138 and 140 increases the overall gain of the differential amplifier.

Assuming, at this time, that the connection 204 is absent, the contact of the potentiometer 142 is so adjusted that the point V is at the required potential half that of the positive potential supply line 84. This condition is achieved by the fact that the output from the cathode follower 148 controls the potential at point W. With the high gain differential amplifier involved, this potential is closely maintained after the proper initial adjustment of the contact of potentiometer 142. Accordingly, the triodes 82, 94 and 96 are operating under substantially identical conditions with the resulting product relationship between the potentials at S′, T′, and between W and V. The network consisting of the resistances 105, 106, 110, 112, 107, 108, 124 and 116 provides linear relationship between the pairs of potentials at S and S′, at T and T′, and between W and V and at U. Accordingly, the product relationship which has been described also exists between the potentials at the input and output terminals, with, perhaps a different constant of proportionality, so that there results the relationship given at the bottom of Figure 3 involving the equality of the potential $E_U$ at output terminal U with the product of the potentials $E_S$ and $E_T$ at the input terminals S and T, with a proportionality constant K.

The purpose of the network is to extend the accurate range of operation beyond that involved at the tubes themselves and particularly through zero values of the inputs. Operations near zero values of the inputs are particularly required in many instances.

While the portion of the circuit of Figure 3 so far described is quite stable against the effects of tube drift and filament voltage variation, where a high degree of stability is required it is desirable to add an anti-drift circuit which is illustrated at 154. This is possible when the multiplier is to be used in a cyclically repetitive system for which the particular circuit shown was designed. The purpose of the anti-drift circuit is to apply a potential to the grid of triode 80 such that the value of the product voltage appearing at terminal U is maintained at the proper value at some time during the cycle. For this purpose, a negative zero-time pulse is introduced at terminal 174, if the time for comparison is, as is usual, taken as the beginning of the cycle. It will be evident that the time pulse which samples the value of the product output may be caused to occur at any desired time during the cycle at which the product should have a particular value.

The terminal U is connected through line 156 and resistor 158 to the grid of a triode 160 which is associated with a second triode 166 in a differential amplifier circuit. The grid of triode 160 is connected between the series resistors 162 and 164 which are located between the positive potential supply line 155 and ground. The anode of triode 160 is connected directly to the supply line 155. The anode of triode 166 is connected to the positive potential supply line through load resistor 163. The cathodes of triodes 160 and 166 are connected together and to ground through a common resistor 172.

The grid of triode 166 is connected between resistors 167 and 169 which, together with an adjustable resistor 165, are connected in series between the positive potential supply line and ground. The adjustable resistor at 165 serves to adjust the potential of the grid of triode 166 to the value which should appear at U at the time of sampling.

The anode of triode 166 is connected to the anode of a triode 178 the cathode of which is connected to ground through a resistor 184. The grid of triode 178 is connected to the junction of the resistors 168 and 170 which are in series between the positive potential supply line 155 and ground. The potential of the grid determined by the last mentioned connection normally maintains the triode 178 conducting heavily so that the potential existing at its anode and at the anode of triode 166 is low. The grid of triode 178 is also connected to the pulse input terminal 174 through condenser 176.

The anodes of triodes 166 and 178 are connected to the grid of a triode 182 connected in a cathode follower arrangement with a resistance 186. To the cathode of triode 182, there is connected the anode of diode 188 the cathode of which is connected to one terminal of a condenser 190 the other terminal of which is grounded. The cathode of diode 188 is also connected to the grid of a triode 192 arranged in a cathode follower circuit with series resistors 194 and 196 running to ground. The grid of triode 192 is connected to the junction of these last mentioned resistors through resistor 198. The cathode of triode 192 is connected through resistor 200 to one terminal of a condenser 202, the other terminal of which is grounded. The ungrounded terminal of condenser 202 is connected through line 204 and resistor 121 to the grid of triode 80.

The operation of the anti-drift circuit may be described as follows:

In the absence of a zero-time or other testing pulse at the terminal 174, the triode 178 is heavily conducting and the grid of triode 182 will then be at a low potential so that its cathode will have a lower potential than the cathode of diode 188, the latter being the potential which has from previous operation accumulated on the condenser 190. When a negative testing pulse appears at the terminal 174, at zero-time or otherwise, the triode 178 will become relatively non-conducting with the restult that the differential amplifier comprising the triodes 160 and 166 will become operative to deliver to the grid of triode 182 and amplified potential corresponding to the differenece of potential at U and at the grid of triode 166 as preset by the adjustment of the resistance 165. If, as a result of this difference, the cathode of triode 182 becomes more positive than the ungrounded terminal of the condenser 190, current will flow through the diode 188 to charge additionally the condenser 190 with the resulting increase of potential of the grid of triode 192 and additional charging at the ungrounded terminal of the condenser 202. Thus, a corrective signal is applied to the grid of triode 80 serving to adjust the multiplying circuit. If the output from the differential amplifier is such that the cathode of triode 182 is raised to a potential less than that existing at the ungrounded terminal of condenser 190, the diode 188 will remain cut off and condenser 190 will discharge through the RC circuit in which it is located. Similar discharge will occur from the condenser 202 through its RC circuit. The result will be a drop of potential of the grid of triode 80 to compensate for the drift which gave rise to the difference of potential of the terminal U from that desired at the instant of testing. The RC circuits which have been mentioned are provided with suitable time constants to correspond to the repetition rate at which the multiplier is being operated. Since drifts in general are slow, long time constants may generally be used with excellent maintenance of accuracy in the multiplying circuit.

The circuits of Figures 1 and 2 involve the same limitation as other known multiplying circuits of being unable to multiply directly negative quantities to give proper signs of outputs. The circuit of Figure 3 may multiply positive by negative quantities or two negative quantities, provided the negative quantities are not too large. Circuits of the types illustrated in Figures 1 and 2 may be adapted to the multiplying of negative quantities and the negative range of operation of the circuit of Figure 3 may be extended in accordance with what is diagrammed in Figure 4, involving association with the multiplying circuit of various adding circuits.

Assuming that it is desired to multiply quantities represented by potentials $E_A$ and $E_B$ which may have either positive or negative values, with the result of securing properly signed products, the potential $E_A$ is added in a conventional adding circuit 140 to a fixed positive potential $e_A$ which is of such magnitude that the sum will always be positive. The potential $E_B$ is likewise added in a circuit 142 to a fixed potential $e_B$ having the same property of producing a sum output which will always be positive. These two positive quantities are then introduced into the multiplying circuit 144 which may be of either of the types shown in Figures 1 and 3 or, in fact, of many other types. The product $E_O$ from the multiplying circuit will then have the form indicated in Equation 1 in which K is a constant. A further adding circuit 146 is provided which not only has the inputs $E_A$ and $E_B$ but an input corresponding to the product of $e_A$ and $e_B$. It should be noted that these last quantities are constants and, accordingly, this last introduction amounts only to the introduction of a fixed potential. In the adding circuit 146, by means of suitable resistances and potentiometers, the inputs are added to provide an output which is indicated in the diagram. It should here again be noted that $e_A$ and $e_B$ are merely constants and, therefore, represent merely portions of the inputs $E_B$ and $E_A$. The output from the adding circuit 146 is fed to an adding circuit 148 where it is added to $E_O$ from the output of the multiplying circuit. The output of circuit 148 designated $E_P$ is as given in Equation 2 from which it will be noted that it is proportional to the product of $E_A$ and $E_B$. The adding circuits may be of any well-known types, the term "adding" being here used to include subtraction. For example, highly precise circuits of this type are disclosed in my application Serial No. 239,279, filed July 30, 1951. It will be evident that following this procedure the multiplication of negative quantities will result in products of proper sign.

Another circuit for extending the range of multiplication to that of negative quantities is illustrated in Figure 5 and involves the use of a high gain differential amplifier. In explanation of the operation there are indicated in Figure 5 potentials appearing at various points of the circuit, and for purposes of illustration it is assumed that the input potentials to be multiplied vary from minus 50 volts to plus 50 volts, the numerical values of potentials being given consistent with such range of operation.

The potentials to be multiplied are $E_1$ and $E_2$ applied to the respective terminals 162 and 164. These terminals are connected to an array of resistors 166, 168, 170, 172, 174, 176 and 178. The junction of resistors 176 and 178 is connected to a terminal 182 to which there is applied 150 volts. A limited range multiplier, i. e., one which will operate only on positive input potentials, is indicated at 186 and may be of any of the types previously described or other conventional types. Its inputs are provided, respectively, from the junction of resistors 170 and 176 and from the junction of resistors 174 and 178. Its output is delivered at 188 to the series arrangement of resistors 190 and 192 running to ground. A high gain differential amplifier has one input provided from the junction of resistors 190 and 192, and its other input from the terminal 184 at the junction of resistors 166 and 168. The output of the differential amplifier is to a terminal 196 and to the series arrangement of resistors 198 and 200 running to ground. The junction of these last resistors is connected to the same input as the terminal 184.

It will be noted that certain of the resistors mentioned have the same value R, while resistor 192 has a value 2R, resistor 198 has a value three-halves R and resistor 200 has a value 3R. Resistors 170, 176, 178 and 174 have equal values $R_1$ which need not be related to R.

By following the voltage legends at the various terminals and connections, the operation of the circuit will be apparent. At terminals 162 and 164 the applied potentials $E_1$ and $E_2$ may vary both positively and negatively. Through the introduction of the positive 150 volt potential at terminal 182, the inputs to the multiplier are made essentially positive. The output of the multiplier is also essentially positive. The high gain differential amplifier receives only positive potentials but, since it operates between a high positive potential and a high negative potential, its output may be either positive or negative within the limits of operation. It will be noted that a scale factor of 100 is introduced in the value of the output potential $E_O$ so that the differential amplifier output varies within reasonable limits even though both of the inputs may be 50 volts.

What is claimed is:

1. A circuit for performing multiplication and division comprising a first pair of triodes having their anodes connected and their iathodes connected, a second pair of triodes having their anodes connected and their cathodes connected and their cathodes connected, a second pair of being connected to the cathodes of the triodes of the first pair so that the total anode-cathode current of the first pair flows in the parallel anode-cathode arrangement of the second pair, each of the triode grids being connected through a high resistance to a corresponding input terminal, a differential amplifier having a pair of input terminals and an output terminal, one of said input terminals of the differential amplifier being connected to a source of substantially constant potential, the other input terminal of the differential amplifier being connected to the connection between the cathodes of the first pair of triodes and the anodes of the second pair of triodes, and the output terminal of the differential amplifier being connected to the input terminal of one of said triodes.

2. A circuit for performing multiplication and division comprising a first pair of triodes having their anodes connected and their cathodes connected, a second pair of triodes having their anodes connected and their cathodes connected, the anodes of the triodes of the second pair being connected to the cathodes of the triodes of the first pair so that the total anode-cathode current of the first pair flows in the parallel anode-cathode arrangement of the second pair, each of the triode grids being connected through a high resistance to a corresponding input terminal, a differential amplifier having a pair of input terminals and an output terminal, one of said input terminals of the differential amplifier being connected to a source of substantially constant potential, the other input terminal of the differential amplifier being connected to the connection between the cathodes of the first pair of triodes and the anodes of the second pair of triodes, and the output terminal of the differential amplifier being connected to the input terminal of one of said triodes of the first pair.

3. A circuit for performing multiplication and division comprising a first pair of triodes having their anodes connected and their cathodes connected through a resistance, a second pair of triodes having their anodes connected and their cathodes connected through a resistance, the anodes of the triodes of the second pair being connected to the cathodes of the triodes of the first pair so that the total anode-cathode current of the first pair flows in the parallel anode-cathode arrangement of the second pair, each of the triode grids being connected through a high resistance to a corresponding input terminal, a differential amplifier having a pair of input terminals and an output terminal, one of said input terminals of the differential amplifier being connected to a source of substantially constant potential, the other input terminal of the differential amplifier being connected to the connection between the cathodes of the first pair of triodes and the anodes of the second pair of triodes, and the output terminal of the differential amplifier being connected to the input terminal of one of said triodes.

4. A circuit for performing multiplication and division comprising a first pair of triodes having their anodes connected and their cathodes connected through a resistance, a second pair of triodes having their anodes connected and their cathodes connected through a resistance, the anodes of the triodes of the second pair being connected to the cathodes of the triodes of the first pair so that the total anode-cathode current of the first pair flows in the parallel anode-cathode arrangement of the second pair, each of the triode grids being connected through a high resistance to a corresponding input terminal, a differential amplifier having a pair of input terminals and an output terminal, one of said input terminals of the differential amplifier being connected to a source of substantially constant potential, the other input terminal of the differential amplifier being connected to the connection between the cathodes of the first pair of triodes and the anodes of the second pair of triodes, and the output terminal of the differential amplifier being connected to the input terminal of one of said triodes of the first pair.

5. A division circuit comprising a differential amplifier having a pair of input terminals and an output terminal, a pair of triodes associated with one of said input terminals, the anodes of said triodes being connected together, to a common load resistance, and to said associated input terminal, and each of the triode grids being connected to a high resistance, means connecting the end of one of said high resistances remote from its connected grid to the output terminal of said differential amplifier, and a third triode having its anode connected to the other input terminal of the differential amplifier and to a load resistance, and its grid connected to a high resistance.

6. A division circuit comprising a differential amplifier having a pair of input terminals and an output terminal, a pair of triodes associated with one of said input terminals, the anodes of said triodes being connected together, to a common load resistance, and to said associated input terminal, and each of the triode grids being connected to a high resistance, means connecting the end of one of said high resistances remote from its connected grid to the output terminal of said differential amplifier, and a third triode having its anode connected to the other input terminal of the differential amplifier and to a load resistance, and its grid connected to a high resistance, said means comprising a cathode follower circuit having the cathode of its tube connected to said high resistance end and the grid of its tube connected to said output terminal of the differential amplifier.

7. A circuit for performing multiplication and division comprising a first pair of triodes having their anodes connected and their cathodes connected, a second pair of triodes having their anodes connected and their cathodes connected, the anodes of the triodes of the second pair being connected to the cathodes of the triodes of the first pair so that the total anode-cathode current of the first pair flows in the parallel anode-cathode arrangement of the second pair, each of the triode grids being connected to a corresponding input terminal, a differential amplifier having a pair of input terminals and an output terminal, one of said input terminals of the differential amplifier being connected to a source of substantially constant potential, the other input terminal of the different amplifier being connected to the connection between the cathodes of the first pair of triodes and the anodes of the second pair of triodes, and the output terminal of the differential amplifier being connected to the input terminal of one of said triodes.

8. A circuit for performing multiplication and division comprising a first pair of triodes having their anodes connected and their cathodes connected, a second pair of triodes having their anodes connected and their cathodes connected, the anodes of the triodes of the second pair being connected to the cathodes of the triodes of the first pair so that the total anode-cathode current of the first pair flows in the parallel anode-cathode arrangement of the second pair, each of the triode grids being connected to a corresponding input terminal, a differential amplifier having a pair of input terminals and an output terminal, one of said input terminals of the differential amplifier being connected to a source of substantially constant potential, the other input terminal of the differential amplifier being connected to the connection between the cathodes of the first pair of triodes and the anodes of the second pair of triodes, and the output terminal of the differential amplifier being connected to the input terminal of one of said triodes of the first pair.

9. A circuit for performing multiplication and division comprising a first pair of triodes having their anodes connected and their cathodes connected through a resistance, a second pair of triodes having their anodes connected and their cathodes connected through a resistance, the anodes of the triodes of the second pair being connected to the cathodes of the triodes of the first pair so that the total anode-cathode current of the first pair flows in the parallel anode-cathode arrangement of the second pair, each of the triode grids being connected to a corresponding input terminal, a differential amplifier having a pair of input terminals and an output terminal, one of said input terminals of the differential amplifier being connected to a source of substantially constant potential, the other input terminal of the differential amplifier being connected to the connection between the cathodes of the first pair of triodes and the anodes of the second pair of triodes, and the output terminal of the differential amplifier being connected to the input terminal of one of said triodes.

10. A circuit for performing multiplication and division comprising a first pair of triodes having their anodes connected and their cathodes connected through a resistance, a second pair of triodes having their anodes connected and their cathodes connected through a resistance, the anodes of the triodes of the second pair being connected to the cathodes of the triodes of the first pair so that the total anode-cathode current of the first pair flows in the parallel anode-cathode arrangement of the second pair, each of the triode grids being connected to a corresponding input terminal, a differential amplifier having a pair of input terminals and an output terminal, one of said input terminals of the differential amplifier being connected to a source of substantially constant potential, the other input terminal of the differential amplifier being connected to the connection between the cathodes of the first pair of triodes and the anodes of the second pair of triodes, and the output terminal of the differential amplifier being connected to the input terminal of one of said triodes of the first pair.

No references cited.